United States Patent
Bauerschmidt et al.

[11] Patent Number: 6,137,776
[45] Date of Patent: Oct. 24, 2000

[54] SWITCHING STATION

[75] Inventors: Peter Bauerschmidt, Schwabach; Ottmar Beierl, Aurachtal; Werner Griesacker, Erlangen; Uwe Linnert, Fürth, all of Germany

[73] Assignee: Siemens Aktiengesellschaft, Munich, Germany

[21] Appl. No.: 09/240,716

[22] Filed: Jan. 29, 1999

Related U.S. Application Data

[63] Continuation of application No. PCT/DE97/01513, Jul. 17, 1997.

[30] Foreign Application Priority Data

Jul. 29, 1996 [DE] Germany ............... 196 30 614

[51] Int. Cl.⁷ ................................................. H04J 5/00
[52] U.S. Cl. .................. 370/216; 370/401; 307/125; 307/130; 340/506; 340/825.06
[58] Field of Search ................. 370/216, 225, 370/228, 401, 402; 307/112, 126, 125, 130, 131; 364/528.21; 340/505, 506, 517, 525, 635, 660–663, 825.06–825.08, 825.52, 825.54, 288, 310.01

[56] References Cited

U.S. PATENT DOCUMENTS

| | | | |
|---|---|---|---|
| 4,204,249 | 5/1980 | Dye et al. ........................... | 713/330 |
| 4,234,926 | 11/1980 | Wallace et al. ..................... | 702/188 |
| 4,497,031 | 1/1985 | Froehling et al. .................. | 700/276 |
| 4,536,126 | 8/1985 | Reuther ............................... | 280/40 |
| 5,412,643 | 5/1995 | Kogure ................................ | 370/225 |
| 5,859,711 | 1/1999 | Barry et al. ......................... | 358/296 |

FOREIGN PATENT DOCUMENTS

| | | |
|---|---|---|
| 0 3355 532 A2 | 2/1990 | European Pat. Off. . |
| 0 355 532 B1 | 2/1990 | European Pat. Off. . |
| 0 666 631 A2 | 8/1995 | European Pat. Off. . |
| 35 17 566 A1 | 11/1985 | Germany . |
| 39 07 652 A1 | 9/1990 | Germany . |
| 195 01 489 A1 | 7/1996 | Germany . |
| 195 20 596 A1 | 12/1996 | Germany . |

*Primary Examiner*—Hassan Kizou
*Assistant Examiner*—Mitchell Slavitt
*Attorney, Agent, or Firm*—Herbert L. Lerner; Laurence A. Greenberg; Werner H. Stemer

[57] ABSTRACT

A switching station for high or medium voltage offers a simple and practicable configuration for information transmission with a high security against failure. Panel devices are connected through a first bus line to a central control device. The panel devices feed a second bus line to which control devices of switching devices of the switch panel are connected. The second bus line is formed by an auxiliary line of the switching station.

10 Claims, 3 Drawing Sheets

SWITCHING STATION

CROSS-REFERENCE TO RELATED APPLICATION

This application is a continuation of copending International application No. PCT/DE97/01513, filed Jul. 17, 1997, which designated the United States.

BACKGROUND OF THE INVENTION

Field of the Invention

The invention relates to a switching station for high or medium voltage having a central control device.

Switching stations in high or medium voltage engineering are generally driven through physical control lines which may, for example, be part of a so-called "control technology for switching stations". A wide range of line configurations therefor are described by way of example in an article entitled "Neue Leittechnik für Schaltanlagen durch Einsatz von Mikrorechnern" [New Control Technology For Switching Stations by Using Microcomputers] in ETG Fachberichte No. 14, bearing the title: "Mikroelektronik in der Energietechnik" [Microelectronics in Power Engineering], pages 22 to 31.

In that case, each branching point of a switching station is respectively assigned a branching device which is supplied with power through an auxiliary voltage supply of the station and is connected to the switching devices through parallel wiring.

European Patent 0 355 532 B1 discloses a configuration for the transmission of data and a supply voltage through a bus line, wherein an application in process engineering is envisaged. In that case, panel devices which are located physically remote from one another can be connected to a remote central station in an intrinsically-safe and explosion-proof manner with little effort. A voltage supply line in the respective station can preferably serve in that case as the bus line.

However, such supply lines are generally afflicted by faults and voltage dips, with the result that in stations which are relevant for safety, reliable data transmission between the respective devices cannot be absolutely ensured. This is particularly critical in the case of use in switching stations for power supply, in which there is additionally the problem of electromagnetic influence.

In German Published, Non-Prosecuted Patent Application 195 20 596 A1, it had already been suggested to provide redundant information transfer through an auxiliary voltage supply in switching stations.

SUMMARY OF THE INVENTION

It is accordingly an object of the invention to provide a switching station, which overcomes the hereinafore-mentioned disadvantages of the heretofore-known devices of this general type and which provides a simple and practicable solution for information transfer with a higher safeguard against failure in a switching station for high or medium voltage.

With the foregoing and other objects in view there is provided, in accordance with the invention, a switching station for high or medium voltage, comprising a central control device; a first bus line connected to the central control device; first interfaces connected to the first bus line; a given number of panel devices each connected to a respective one of the first interfaces; second interfaces each connected to a respective one of the panel devices; a panel-related second bus line formed by an auxiliary line and connected to a respective one of the second interfaces; grounding and/or isolating switches having control devices connected to the panel-related second bus line; and at least one power circuit breaker connected to a respective one of the panel devices.

With reference to its control engineering construction, this switching station has a structure which is adapted in an optimum way to the requirements of the switching station, with the effort for wiring for control lines being kept low at the panel control level. In this case, about 20 wires can be saved, for example, for an average switching device.

In accordance with another feature of the invention, the power circuit breakers are connected to the respectively associated panel devices through a third interface. Through the use of this structure, time-critical operating procedures, for example protective off commands, can be executed directly, rapidly and reliably without the operational reliability of the station being critically threatened.

In accordance with a further feature of the invention, the third interface may be constructed as a bus interface, to which further participating devices may be connected. This interface is thus multi-functional. The further participating devices include, for example, mobile terminals, in particular a laptop, for data entry and data interrogation, protective devices, input devices for messages and measured values or other devices needed at the panel control level.

In accordance with an added feature of the invention, the third interface has a higher data transmission rate than the first interface, resulting in the increased information flow requirement at this interface being taken into account.

In accordance with an additional feature of the invention, the control devices of the respective power circuit breakers form a structural unit with the respectively associated panel devices. This permits a space-saving construction within the switching station. The panel-related "intelligence" can thus, for example, be integrated in the control cabinet of the power circuit breaker.

In accordance with yet another feature of the invention, the panel devices are advantageously each assigned a switching fault protective device, so that reliable switching is ensured at the panel level. In this case, field-related and station-related interlocking conditions can be applied.

In accordance with a concomitant feature of the invention, the respective switching fault protective devices in each case form one structural unit with the associated panel devices, as a result of which the space-saving construction is improved. The switching fault protective device may also be a functional constituent part of the panel device in the sense of a program module, given a structure using digital data processing with a computer.

Other features which are considered as characteristic for the invention are set forth in the appended claims.

Although the invention is illustrated and described herein as embodied in a switching station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
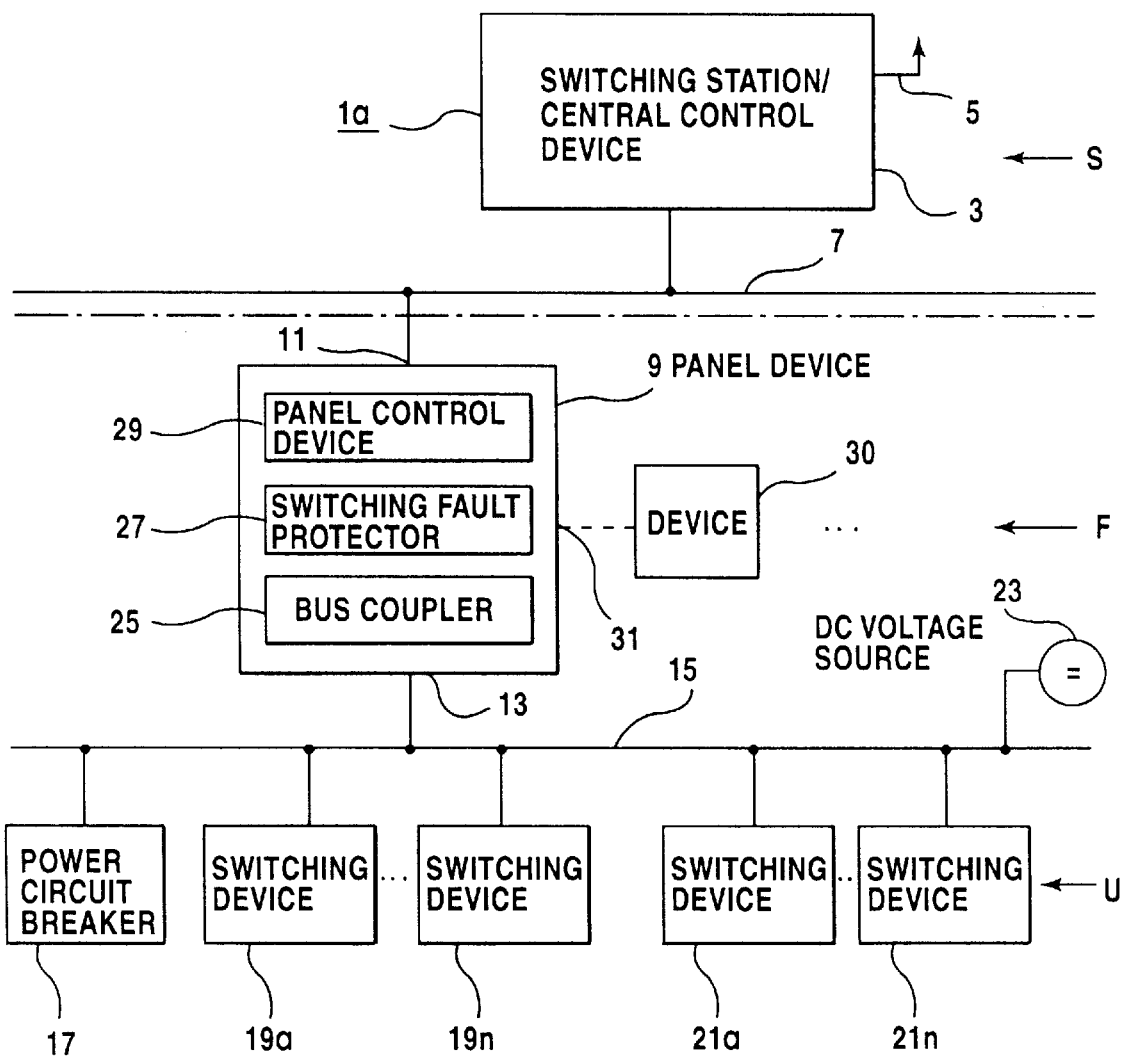
FIG. 1 is a basic block diagram showing the control engineering construction of a switching station.

Referring now to the figures of the drawings in detail and first, particularly, to FIG. 1 thereof, there is seen a first switching station 1a with a basic illustration of its control engineering data connections. A central control device 3 which is provided at a station control level S in this case is used as a central control and command central station for the entire switching station. It is of course possible, according to the prior art, for the switching station to be equipped with operating and visual display devices, in particular a non-illustrated monitor, keyboard, printer etc.

A so-called remote action interface 5 can be provided in order to provide a connection to a higher-order network control central station. Reference is also made to the article already mentioned at the outset in relation to general control engineering points of view of this type in switching stations according to the prior art. A panel control level and a device level are respectively designated by reference symbols F and U. In the figures, the levels are separated from one another by dot-dash lines.

Figure 3:
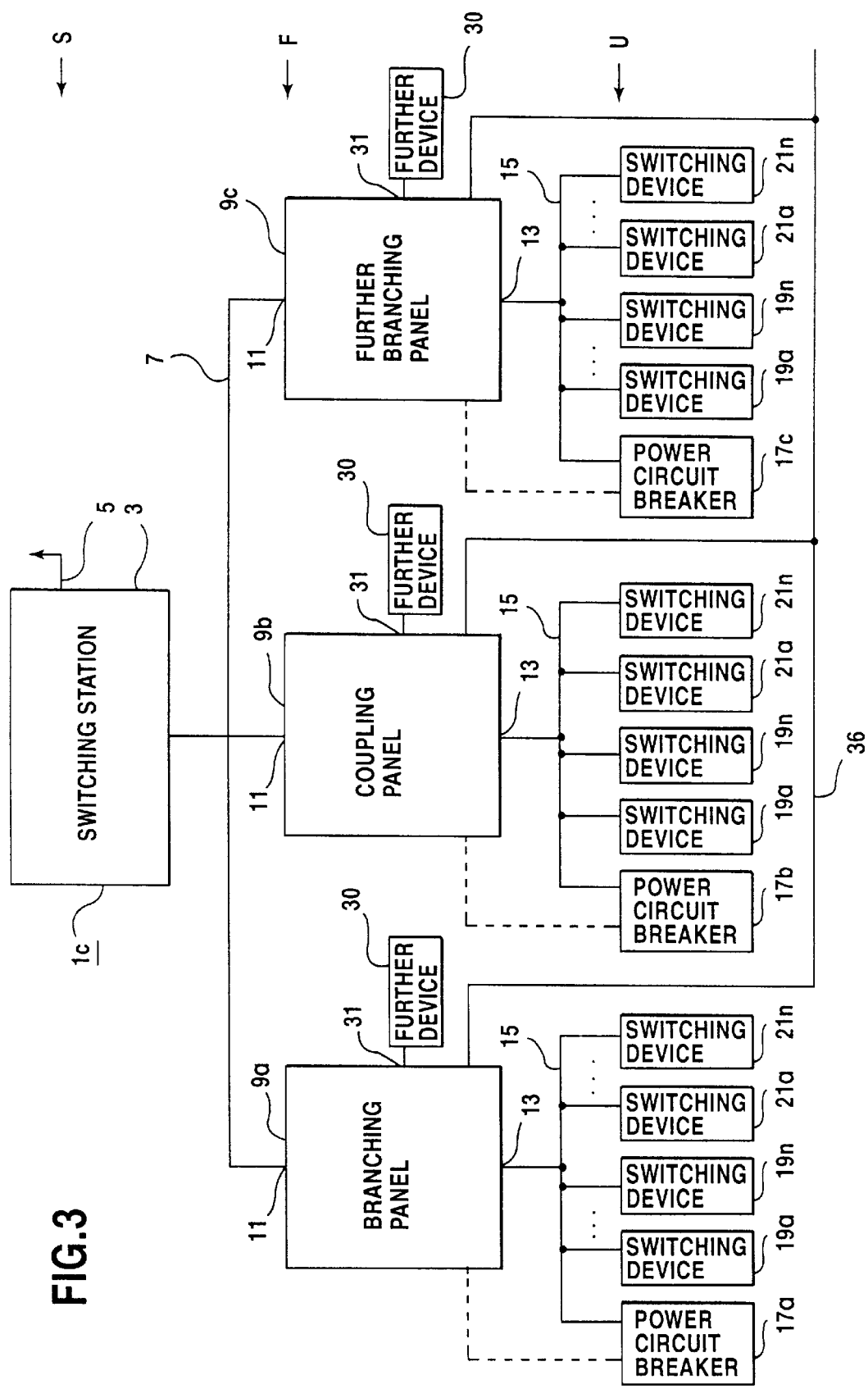
FIG. 3 is a block diagram of the switching station according to FIG. 1 with a data connection which covers more than one panel.

The central control device 3 is connected through a first bus line 7 to an arbitrary number of panel devices 9. Only one panel device 9 is illustrated in the present case for reasons of simplicity. Reference is also made to FIG. 3, for example, for a multiple configuration.

The central control device 3 has an appropriate output or an appropriate interface for the purpose of connecting to the first bus line 7. Since this first bus line 7 is intended to be available for the entire station, it may also be designated as a station bus.

The panel device 9 has a first interface 11 for the connection of the first bus line 7 and a second interface 13 for the connection of a panel-related second bus line 15. All of the switching devices of one panel, for example a power circuit breaker 17, a predeterminable number of grounding switches 19a to 19n and a predeterminable number of isolating switches 21a to 21n are connected through this second bus line 15.

The second bus line 15 in this case is formed by an auxiliary line which is used for an auxiliary voltage supply of the devices internal to the panel. In order to constitute this function, the second bus line 15 is connected to a DC voltage source 23. The DC voltage source 23 supplies the electrical power for the auxiliary devices of the devices provided in the panel, for example for motor drives of switching devices, for detector devices. etc.

In this sense, in the case of the second bus line 15 it is also possible to speak of a so-called "auxiliary bus". That is to say, the auxiliary supply is simultaneously used as a bus. This is preferably performed in a panel-related manner. In other words, no parallel wiring is necessary for the transmission of a command or message between the central control device 3 and the respective switching devices 17 to 21n, in order to transmit the respective information. Use is made of a line which is already present, namely an auxiliary line, as the second bus line 15.

The panel-related panel device 9 in this case may include a plurality of functions, devices or components. It may also constitute a housing unit, in which various components can be accommodated in order to fulfil the functions described below. The components, which are known per se, are illustrated separately in the figures without connecting lines.

A bus coupler 25 takes care of data traffic between the panel device 9 and the second bus line 15. In this case, for example, it is also possible for priorities to be observed or provided in the processing sequence between different switching devices.

A further device or function is a switching fault protective device, which is referred to below as a switching fault protector 27, that undertakes appropriate releases or blockages in accordance with relevant regulations for the sequence of switching operations. Therefore, in this case, the interlocking conditions for the respective switching devices 17 to 21n are processed. These may be panel-related, or station-related taking into account higher-order points of view through the central control device 3.

In addition, the panel device 9 includes a general panel control device 29 which is responsible in particular for the data traffic to and from the central control device 3 and undertakes general functional tasks for the respective panel. In this case, for example, it is also possible to provide parameter data or general panel-related functions, for example for processing a message or the storage of parameter-setting data.

In addition, it is also optionally possible for a further device 30, for example a parameter-setting device or a hand-held terminal, to be connected to the panel device 9 through an arbitrarily configured third interface 31.

In principal, the illustrated second bus line 15 can also be a bus line system in which, for example, redundant information transmission is provided. Stations in which a plurality of auxiliary supplies, for example an AC voltage and DC voltage supply, are located for each panel, are particularly suitable therefor. As a result of this redundant configuration, the data transmission in the panel can be configured significantly more reliably.

An auxiliary bus of this type can be viewed as a cost-effective and low-effort supplement to a central bus system (in accordance with the first bus line 7) or to a panel-related process bus, to which all of the operating devices in the panel would have to be connected. The present configuration therefore provides not only decentralization of the processing device but also of the entire bus technology.

Figure 2:
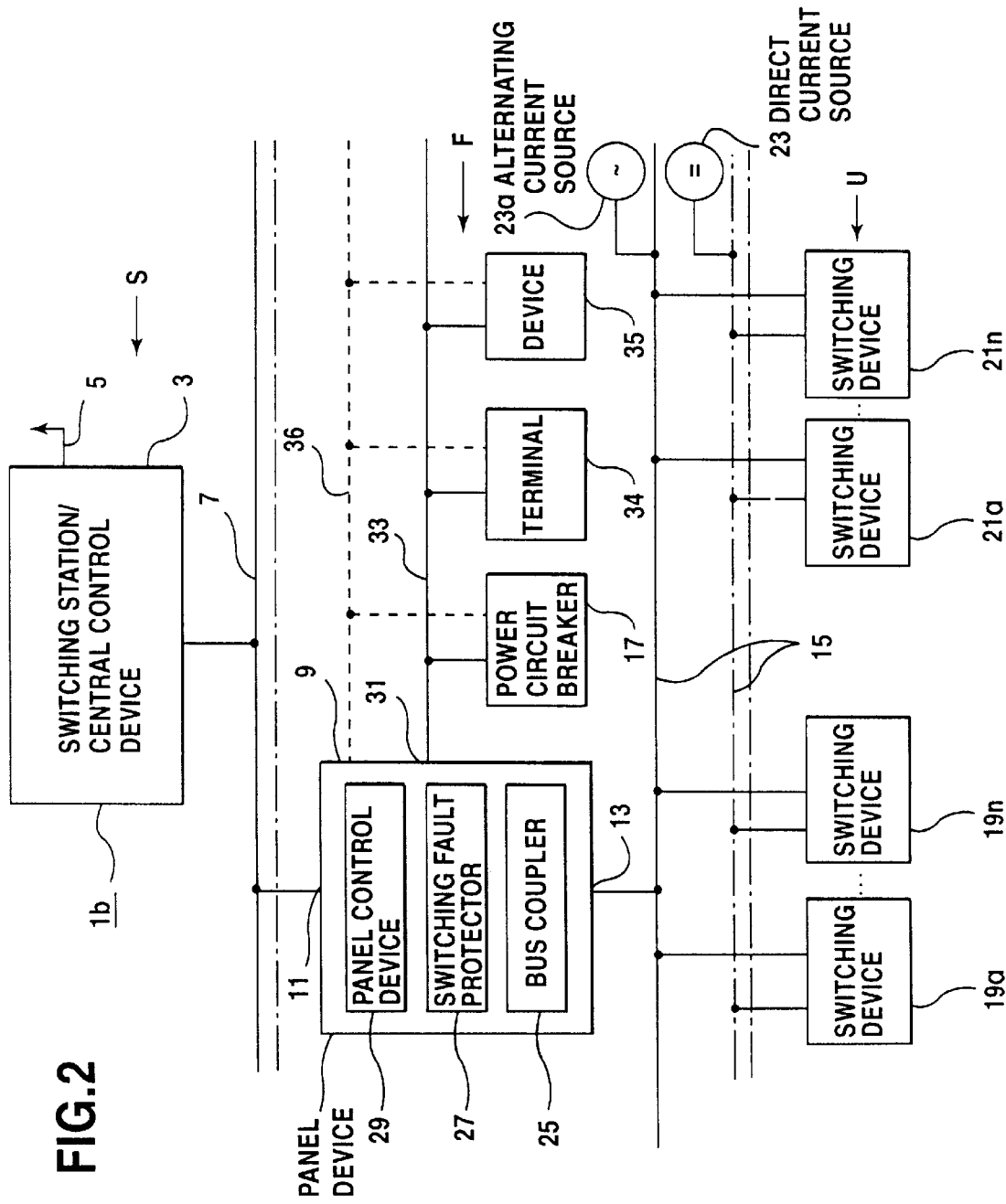
FIG. 2 is a block diagram showing a further alternative switching station.

FIG. 2 shows an alternative second switching station 1b in which the panel device 9 has a third interface 31 for a third bus line 33 with reference to the entire panel, that is to say to the panel control level F. This third bus line 33 has a significantly higher data transmission rate as compared with the second bus line 15 and is therefore particularly suitable for the connection of devices with a high information requirement or those which need time-critical processing. These include, in particular, the power circuit breaker 17 with its associated control system. Further devices may, for example, be a terminal 34 or other panel-related devices, for example a protective device, an active measurement transducer and an input/output device. A device indicated by reference numeral 35 is shown as an example of such devices.

It is of course possible, for a redundant data connection through a further bus line 36 (illustrated with dashed lines) to be additionally provided for this panel-related third bus line 33. In this way, reliable operational management is ensured in the case of information transmissions which are relevant to safety and have a high data transmission rate. In the same sense, the second bus line 15 can also be redundantly constructed. For this purpose, FIG. 2 shows a double system in which an auxiliary supply is provided through DC and AC voltage sources 23 and 23*a*.

In the case of the structure according to FIG. 2, it is of course true that the configuration of the devices or functional blocks, in particular the bus coupler 25, the switching fault protector 27 and the panel control device 29 can be configured, grouped or divided as desired. It is thus conceivable, for example, for individual partial functions to also form one structural unit with a non-illustrated control device of the power circuit breaker 17. To this end, for example, integration of the switching fault protector 27 in the power circuit breaker 17 would be suggested. The physical and/or functional incorporation is thus variable.

FIG. 3 shows a switching station 1*c* having a plurality of panels. For example, panel devices 9*a*, 9*b*, 9*c* can be a branching panel, a coupling panel and a further branching panel, respectively. What has already been stated above applies to the internal construction of the panel devices 9*a*, 9*b*, 9*c*.

The panel-related construction equates in principle to the structure according to FIG. 1. An alternative coupling directly to the panel devices 9*a*, 9*b*, 9*c* is shown in dashed lines for the respective power circuit breakers 17*a*, 17*b*, 17*c*.

In addition, in the case of this overall representation, a bus 36 is provided, which can likewise be constructed as an auxiliary bus or else as an additional bus using conventional bus technology. In this case it is important that the bus 36 be effective over more than one panel and connect the panel devices 9*a* to 9*c* to one another. This can be of particular interest, for example, for the switching fault protective function. This applies in particular when interlocks extending over more than one panel have to be provided, in which central information is present in a coupler bay. In this case, an interrogation then takes place from the respective branching point to the higher-order panel device having a central function, that is the present panel device 9*b*.

It is essential for the present concept that a hierarchical construction be provided which also includes the bus structure, in relation to the control engineering devices of the switching station. The lowest bus level in the panel in this case is formed in a cost-effective manner by an auxiliary bus in which no additional wiring in the panel has to be provided.

It may be assumed, on the basis of the speed of innovation in electronics, that in the future a considerable increase in the data transmission rates for such auxiliary bus systems is to be expected. As a result, in principle it is possible for even the entire data traffic of an installation to be routed through an auxiliary bus system in the future. This also applies to data and parameters of such devices, with particular attention having to be paid during the development to time-critical functions.

We claim:

1. A switching station for high or medium voltage, comprising:

a central control device;

a first bus line connected to said central control device;

first interfaces connected to said first bus line;

a given number of panel devices each connected to a respective one of said first interfaces;

second interfaces each connected to a respective one of said panel devices;

a panel-related second bus line formed by an auxiliary line and connected to a respective one of said second interfaces;

at least one of grounding and isolating switches having control devices connected to said panel-related second bus line; and at least one power circuit breaker connected to a respective one of said panel devices.

2. The switching station according to claim 1, wherein said at least one power circuit breaker is connected through said second interface to said panel device.

3. The switching station according to claim 1, including a third interface connecting said at least one power circuit breaker to said panel device.

4. The switching station according to claim 3, wherein said third interface is a bus interface, and further participating devices are connected to said third interface.

5. The switching station according to claim 4, wherein said further participating devices are operating devices.

6. The switching station according to claim 4, wherein said further participating devices are protective devices.

7. The switching station according to claim 3, wherein said third interface has a higher data transmission rate than said second interface.

8. The switching station according to claim 1, wherein said control devices of said power circuit breakers each form one structural unit with a respective one of said panel devices.

9. The switching station according to claim 1, including switching fault protective devices associated with said panel devices.

10. The switching station according to claim 9, wherein said switch fault protective devices each form one structural unit with a respective one of said panel devices.

* * * * *